United States Patent
Yamane (10) Patent No.: US 11,532,331 B2
(45) Date of Patent: Dec. 20, 2022

(54) MAGNETIC DISK DEVICE AND VOLTAGE APPLICATION METHOD OF MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Masami Yamane, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/400,811

(22) Filed: Aug. 12, 2021

(65) Prior Publication Data
US 2022/0115041 A1    Apr. 14, 2022

(30) Foreign Application Priority Data
Oct. 13, 2020  (JP) .............................. JP2020-172586

(51) Int. Cl.
*G11B 5/54* (2006.01)
*G11B 21/08* (2006.01)
*G11B 5/00* (2006.01)

(52) U.S. Cl.
CPC ...... *G11B 21/08* (2013.01); *G11B 2005/0021* (2013.01)

(58) Field of Classification Search
CPC ......... G11B 5/54; G11B 5/5547; G11B 19/00; G11B 15/46; G11B 5/00; G11B 15/02; G11B 19/02
USPC .......................... 360/75, 78.05, 86, 73.07, 62
See application file for complete search history.

(56) References Cited

U.S. PATENT DOCUMENTS

| 7,486,465 | B2 | 2/2009 | Kondo |
| 10,319,401 | B1* | 6/2019 | Oyabu ................. G11B 5/3133 |
| 2007/0230034 | A1* | 10/2007 | Kondo .................... G11B 5/582 |
| 2008/0174902 | A1* | 7/2008 | Kim ...................... G11B 5/6005 |
| 2018/0114542 | A1 | 4/2018 | Rausch et al. |
| 2018/0286440 | A1 | 10/2018 | Ishii |

FOREIGN PATENT DOCUMENTS

JP    2009-123290 A    6/2009

* cited by examiner

*Primary Examiner* — Nabil Z Hindi
(74) *Attorney, Agent, or Firm* — Kim & Stewart LLP (57) ABSTRACT

According to one embodiment, a magnetic disk device includes a magnetic disk, a magnetic head, a heater a control section. When making the magnetic head carry out the seek operation from the first position to the second position, the control section starts application of a first voltage to the heater while the seek operation is carried out and, after application of the first voltage, makes the voltage to be applied to the heater a second voltage greater than the first voltage before the magnetic head is positioned to the second position and write of data is started by the magnetic head.

9 Claims, 8 Drawing Sheets

MAGNETIC DISK DEVICE AND VOLTAGE APPLICATION METHOD OF MAGNETIC DISK DEVICE

CROSS-REFERENCE TO RELATED APPLICATIONS

This application is based upon and claims the benefit of priority from Japanese Patent Application No. 2020-172586, filed Oct. 13, 2020, the entire contents of which are incorporated herein by reference.

FIELD

Embodiments described herein relate generally to a magnetic disk device and voltage application method of the magnetic disk device.

BACKGROUND

In a magnetic disk device, a technique of applying a voltage to a heater before write is started is known.

When the operation of applying a voltage to the heater to thereby warm the element section is not carried out sufficiently, the write condition becomes worse, and hence the bit error rate of the first sector of the written sectors becomes deteriorated and this becomes a primary factor in the occurrence of a weak write error. Here, when the time for sufficiently warm the element section in order to stabilize the write operation at the time of data write is defined as the preheat time, by prolonging the preheat time, the magnetic disk device can carry out stable write, and bit error rate can be prevented from becoming deteriorated. On the other hand, by prolonging the preheat time, the write performance of the magnetic disk device is deteriorated. As described above, it can be said that the stable write and write performance are in the tradeoff relationship. In particular, when a seek operation of the magnetic head is carried out concomitantly with the preheat, the seek time is added to the preheat time, and hence the deterioration in the write performance of the magnetic disk device becomes conspicuous.

Thus, it is conceivable that preheat is started while the seek operation is still carried out. However, in recent years, the preheat time has become longer, and thus the need to start warming (applying a voltage to the heater element) the element section in the state where the seek velocity is higher than ever before has arisen. When a voltage is applied to the heater element in a state where the seek velocity is high as described above, the gap (levitation amount) between the magnetic head and recording surface of the magnetic disk varies. For example, in the magnetic disk device, during write of data, the magnetic head is temporarily brought into contact with the recording surface of the magnetic disk, and is thereafter levitated by a predetermined amount, whereby control of adjusting the amount (gap) of levitation from the recording surface is carried out. During such control, when a voltage is applied to the heater in the state where the seek velocity is high, the levitation amount of the magnetic head becomes less than the required amount, and a risk of the magnetic head coming into contact with the recording surface of the magnetic disk arises.

Embodiments described herein aim to provide a magnetic disk device and voltage application method of the magnetic disk device capable of suppressing the variation in the levitation amount and improving the condition at the time of a start of write even when a voltage is applied to the heater element during a seek operation of the magnetic head.

DETAILED DESCRIPTION

In general, according to one embodiment, a magnetic disk device includes a magnetic disk, a magnetic head configured to read/write data from/to the magnetic disk, a heater configured to adjust a distance between the magnetic disk and the magnetic head at the time of write on the basis of a voltage to be applied thereto; and a control section configured to make the magnetic head carry out a seek operation from a first position of the magnetic disk to a second position thereof. when making the magnetic head carry out the seek operation from the first position to the second position, the control section starts application of a first voltage to the heater while the seek operation is carried out and, after application of the first voltage, makes the voltage to be applied to the heater a second voltage greater than the first voltage before the magnetic head is positioned to the second position and write of data is started by the magnetic head.

Embodiments will be described hereinafter with reference to the accompanying drawings. Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 1:
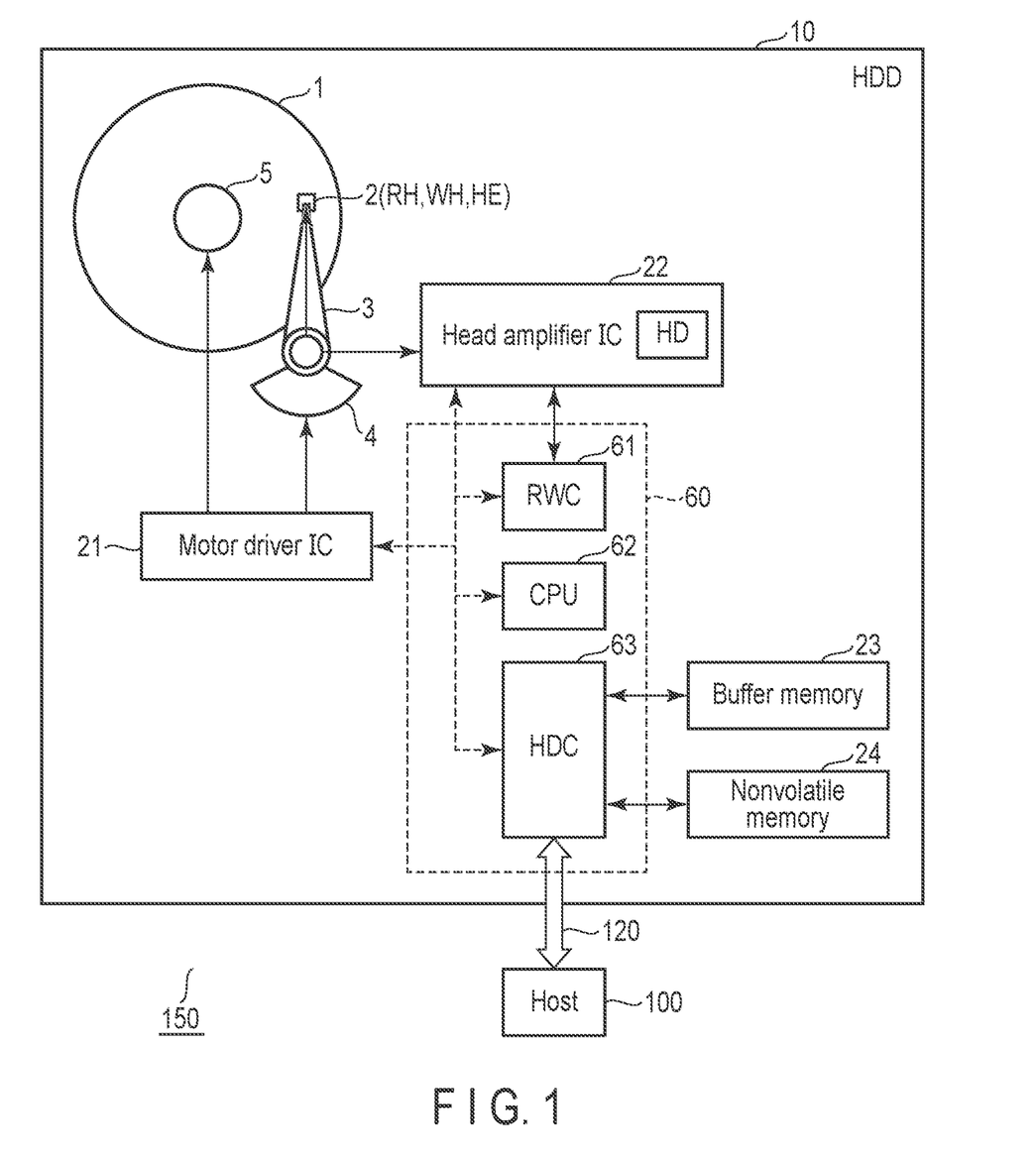
FIG. 1 is a block diagram showing an example of the configuration of a system provided with a magnetic disk device according to a first embodiment.

FIG. 1 is a block diagram showing an example of the configuration of a system 150 provided with a magnetic disk device 10. The magnetic disk device 10 is a hard disk drive (hereinafter also referred to as an HDD 10). The system 150 is provided with a host 100 and HDD 10. A host I/F 120 connects the host 100 and HDD 10 to each other, and is utilized for transmission/reception of a command, user data, command response or status report between the host 100 and HDD 10. The host I/F 120 conforms to, for example, Serial Advanced Technology Attachment (SATA) standard and Serial Attached SCSI (SAS) standard. The HDD 10 is connected to the host 100 through the host I/F 120 and functions as a data storage section of the host 100. For example, the system 150 is a personal computer, mobile device or server device. For example, the host 100 is a chip set IC provided in a personal computer or mobile device or is a server controller provided in a server device.

The HDD 10 has a head-disk assembly (HDA) including a magnetic disk 1, slider (magnetic head) 2, arm 3, voice coil motor (VCM) 4, and spindle motor (SPM) 5. The HDA is accommodated in the housing (illustration omitted) of the HDD 10. The slider 2 includes a read head RH, write head WH, and heater element HE. Further, the HDD 10 has a circuit block including a motor driver IC (hereinafter also referred to as a driver IC) 21, head amplifier IC 22, buffer memory 23, nonvolatile memory 24, and controller 60. The controller 60 is provided with a read/write channel (hereinafter also referred to as an RWC) 61, CPU (control section) 62, and hard disk controller (hereinafter also referred to as an HDC) 63. The head amplifier IC 22 is provided with at least a heater driver HD.

The HDD 10 executes at least processing (write processing) of recording data on the magnetic disk 1, processing (read processing) of reading data recorded on the magnetic disk 1, and processing (levitation control processing) of controlling a levitation height of a part of the slider 2 relative to the magnetic disk 1. The levitation control processing is also called dynamic fly height (DFH) control in some cases and, in the descriptions to be given hereinafter, the levitation control processing will also be called the DFH control. Here, the levitation height corresponds to, for example, the levitation amount of the head section of the slider 2 from the surface of the magnetic disk 1. In the DFH control, by applying a voltage (or current) to the heater element HE provided in the slider 2, a part of the slider 2 (heater element HE and peripheral part of the head section) is heated and is deformed by thermal expansion to thereby be pushed out toward the magnetic disk 1. It should be noted that hereinafter, the current or voltage to be supplied to the heater element HE will be described as a voltage to be applied to the heater element HE.

The pushed-out amount of the part of the slider 2 can be controlled on the basis of information corresponding to the voltage to be applied to the heater element HE. A change in the pushed-out amount of the part of the slider 2 relative to a change in the voltage to be applied to the heater element HE responds not instantly but late according to a certain time constant. For this reason, in this embodiment, preheat processing of heating the heater element HE at timing precedent to the timing at which the head section passes through the target position of the DFH control is executed. By executing the preheat processing in the DFH control, it becomes possible to obtain an appropriate levitation amount of the already-described part of the slider 2 at such timing that the head section just passes through the target position of read processing or write processing. It should be noted that in the descriptions to be given hereinafter, unless otherwise described, the levitation control processing (DFH control) will be described as processing including preheat processing.

Each of the write processing, read processing, levitation control processing, and preheat processing to be described later is executed according to a command transmitted from the host 100 or according to a spontaneous request inside the HDD 10. These processing items are controlled in accordance with a program (firmware) to be executed by the CPU 62. The data of the program is stored in the nonvolatile memory 24 and on the magnetic disk 1 in a nonvolatile manner.

The magnetic disk 1 is rotated by the SPM 5. The SPM 5 is rotation-controlled by a drive voltage or drive current to be supplied thereto from the driver IC 21. The arm 3 and VCM 4 constitute an actuator. The slider 2 is attached to one end of the arm 3. The actuator moves the slider 2 to the target position on the magnetic disk 1. That is, the actuator moves the slider 2 attached to the arm 3 in the radial direction on the disk 1 by the drive of the VCM 4. The VCM 4 is controlled by a drive voltage or drive current to be supplied thereto from the driver IC 21.

The magnetic disk 1 includes recording surfaces, and data is recorded on the recording surface, whereby tracks (data tracks) are formed. That is, the magnetic disk 1 is configured as a recording medium provided with recording surfaces each of which is configured to record data thereon. The recording surface of the magnetic disk 1 includes at least a servo area on which servo data for controlling the position of the slider 2 on the recording surface is recorded, user data area used to record user data to be transmitted from the host 100, and system area for recording system data used to manage the user data recorded on the user data area. A cache area for temporarily recording user data to be recorded on the user data area may also be provided on the recording surface of the magnetic disk 1.

The servo data is data to be recorded in the manufacturing process of the HDD 10 and is not to be recorded after shipment of the HDD 10. The system data includes data to be managed in the write processing and read processing executed in the HDD 10. It should be noted that the system data may be recorded not on the system area of the magnetic disk 1 but in the nonvolatile memory 24. The user data includes not only data transmitted from the host 100 and recorded hereafter, but also data already recorded on the user data area or cache area and data read from the user data area or cache area.

The slider 2 is at least provided with the heater element HE together with the head section including the read head RH and write head WH. The read head RH reads data recorded on a track on the magnetic disk 1. Data to be read includes servo data, user data, and system data. The write head WH writes user data and system data on the magnetic disk 1. The heater element HE generates heat according to the voltage applied thereto and heats a part of the slider 2. The heated part of the slider 2 is thermally expanded and is pushed out toward the magnetic disk 1. Regarding the heater element HE, in this embodiment, one heater element is provided between the read head RH and write head WH or one heater element is provided in each of the vicinity of the read head RH and vicinity of the write head WH. The heater element HE is formed as a resistor or coil functioning as an electrical circuit element. Although in FIG. 1, a single magnetic disk 1 and slider 2 are shown, the HDD 10 may also be provided with a plurality of magnetic disks 1 and a plurality of sliders 2 corresponding to both the recording surfaces of the plurality of magnetic disks 1.

The head amplifier IC 22 includes a read amplifier, write driver (illustrations of both omitted), and heater driver HD. The read amplifier amplifies a read signal read by the read head RH, and outputs the amplified read signal to the RWC 61. The write driver outputs a write current corresponding to write data to be supplied thereto from the RWC 61 to the write head WH. The heater driver HD applies a heater voltage (or heater current) corresponding to heater data to be supplied thereto from the CPU 62 or HDC 63 to the heater element HE. The heater data is data indicating a value corresponding to the heater voltage (or heater current).

The controller 60 is configured as a one-chip integrated circuit including at least the RWC 61, CPU 62, and HDC 63 as one body. The controller 60 is configured as a semiconductor circuit such as SoC, FPGA, ASIC, LSI, and the like. The buffer memory 23 is a volatile memory capable of data transfer higher than the magnetic disk 1, and a DRAM (SDRAM) or SRAM is applied to the buffer memory 23. The nonvolatile memory 24 is a nonvolatile recording section, and a semiconductor memory such as a NOR-type or NAND-type flash memory is applied to the nonvolatile memory 24. The buffer memory 23 and nonvolatile memory 24 may not be connected to the outside of the controller 60 and may be provided inside the controller 60. As to the nonvolatile memory 24, a part of the recording area of the magnetic disk 1 may also be applied thereto.

The RWC 61 includes a read channel and write channel (illustrations of both omitted). The read channel processes an amplified read signal supplied from the head amplifier IC 22 to thereby decode data including servo data and user data. The RWC 61 executes processing concerning error detection and error correction of the user data in the read channel, and creates information used to evaluate the read user data. This information can be transmitted to the CPU 62 in response to a request from the CPU 62. The read channel includes a Viterbi decoding circuit and LDPC decoding circuit. The write channel outputs write data obtained by encoding to-be-written data supplied from the HDC 63 to the head amplifier IC 22.

The HDC 63 is connected to the buffer memory 23 and nonvolatile memory 24, and controls transmission and reception of data to be transferred from/to the HDC 63 itself to/from each of the buffer memory 23 and nonvolatile memory 24. The data to be transferred from/to the HDC 63 to/from the buffer memory 23 includes read data, write data, and data concerning levitation control processing to be transferred from/to the HDC 63 to/from the host 100. The read data is user data read from the magnetic disk 1, and write data is user data to be written to the magnetic disk 1. The data concerning the levitation control processing includes heater data for setting a voltage to be applied to the heater element HE and heater sensitivity data. The heater data is indicated by values corresponding to the voltage, power or heat-generation amount concerning the heater element HE. The heater sensitivity data is data corresponding to an amount of a change in the heat generation amount of the heater element HE or an amount of a change in the pushed-out amount or in the levitation amount of the slider 2 corresponding to the thermal expansion of the peripheral part of the heater element HE relative to an amount of a change in the voltage to be applied to the heater element HE. The data to be transferred from/to the HDC 63 to/from the nonvolatile memory 24 includes programs to be executed by the CPU 62, system data, and data concerning the levitation control processing. Further, the HDC 63 is connected to the RWC 61, and executes processing for data to be input thereto from the RWC 61 or data to be output to the RWC 61. For example, the HDC 63 provides data utilized for PH time adjustment processing and input thereto from the RWC 61 to the CPU 62 in accordance with the control carried out by the CPU 62.

Furthermore, the HDC 63 is connected to the host 100, and executes processing for a command and user data to be transmitted thereto from the host 100 or processing for a command response, status report, and user data to be output to the host 100. The processing for the user data includes processing concerning the write gate in the write processing, processing concerning the read gate in the read processing, and processing concerning the servo gate necessary for the servo control. The HDC 63 notifies the CPU 62 of an execution request for the levitation control processing corresponding to a command input thereto from the host 100. The HDC 63 is configured in such a manner as to include an interface circuit to be used to control transmission/reception of data between the HDC 63 itself and each of the buffer memory 23, nonvolatile memory 24, RWC 61, and host 100. The HDC 63 can output heater data to the heater driver HD. In this case, the HDC 63 may create heater data on the basis of an instruction from the CPU 62 and may output the created heater data or may be supplied with heater data from the CPU 62, and may output the supplied heater data.

The CPU 62 is an IC also called a microprocessor or microcontroller. The CPU 62 controls the VCM 4 through the driver IC 21 to thereby execute positioning control (servo control) of the head section (read head RH and write head WH). The servo control includes at least control of positioning the slider 2 to any position in the radial direction of the magnetic disk 1 and control of moving the slider 2 from the current position toward the target position on the magnetic disk 1. Further, the CPU 62 controls write processing and read processing to/from the magnetic disk 1 at least through the RWC 61. The CPU 62 controls the levitation control processing in parallel with the write processing and read processing. It should be noted that the servo processing can be executed as processing of a part of the write processing and read processing. In the levitation control processing, the CPU 62 outputs heater data to the heater driver HD. In the control of the plurality of processing items, the CPU 62 utilizes the above-described HDA and circuit block in accordance with the program. The CPU 62 is configured as a control section or control circuit for controlling a plurality of processing items.

Owing to the configuration described above, the HDD 10 according to this embodiment can execute a plurality of processing items to be described in detail hereinafter.

Figure 2:
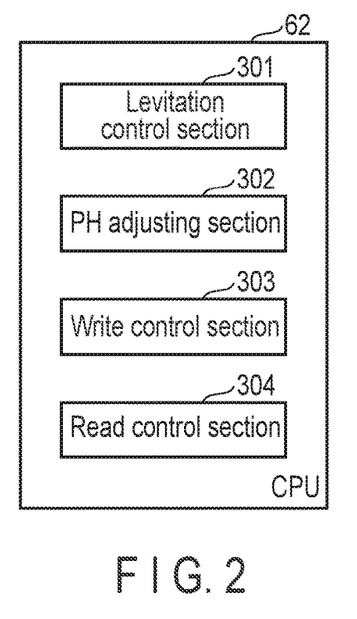
FIG. 2 is a view showing an example of a plurality of functional blocks realized by a CPU according to the first embodiment.

Next, the operation of the CPU 62 will be described below by using FIG. 2. FIG. 2 is a view showing an example of a plurality of functional blocks realized by the CPU 62.

The CPU 62 realizes a plurality of functional sections by operating in accordance with the program. The CPU 62 is provided with a levitation control section 301, preheat adjusting section (hereinafter also referred to as a PH adjusting section) 302, write control section 303, and read control section 304. These functional sections each control at least the RWC 61 and HDC 63. Further, the functional sections provided in the CPU 62 execute various types of processing in cooperation with the HDA and circuit block provided in the HDD 10. The functional sections of the CPU 62 are configured to be able to share information with each other and synchronize with each other in terms of processing timing. Further, the functional sections of the CPU 62 are configured to be able to execute processing items in parallel with each other.

The levitation control section 301 controls the levitation control processing according to an execution request input thereto from the HDC 63. Here, the levitation control processing includes preheat processing. The levitation control section 301 controls the levitation control processing in parallel with the write processing carried out by the write control section 303 or read processing carried out by the read control section 304. The levitation control section 301 receives data necessary for control of the levitation control processing from the HDC 63, and outputs data to be stored for the control of the levitation control processing to the HDC 63. Further, the levitation control section 301 shares the data necessary for the control of the levitation control processing with the write control section 303 or the read control section 304. For example, in response to write processing carried out on a certain track or an execution request for write processing, the levitation control section 301 receives data for setting the levitation amount on this track and data concerning start timing of the levitation control processing from the HDC 63. The data for setting the levitation amount and data concerning start timing of the levitation control processing become in need of correction (update) while the levitation control processing is executed in some cases. In response to this, the levitation control section 301 outputs corrected (updated) data to the HDC 63. The data for setting the levitation amount includes at least heater data and heater sensitivity data. The data concerning start timing of the levitation control processing is data corresponding to time. Further, for example, the levitation control section 301 shares data for specifying write processing or specifying an objective track of the write processing with the write control section 303 or the read control section 304.

The PH adjusting section 302 adjusts the preheat time to be used for the levitation control processing to be controlled by the levitation control section 301. The PH adjusting section 302 adjusts the preheat time in response to an execution request input thereto from the HDC 63. The preheat time is data concerning the time to apply a voltage (to turn the heater on) to the heater element HE before the timing at which the head section passes through the target position (for example, a position specified by the head, track, and sector) of the levitation control processing, and concerning the amount of the voltage to be applied to the heater element HE. The PH adjusting section 302 adjusts the preheat time for the write processing (hereinafter also referred to as WPH time) and preheat time for the read processing (hereinafter also referred to as RPH time). It is sufficient if the PH adjusting section 302 adjusts at least the WPH time and amount of the voltage to be applied to the heater element HE. The PH adjusting section 302 adjusts the preheat time in parallel with the levitation control processing, write processing or read processing. In the descriptions to be given hereinafter, the processing of adjusting the preheat time to be controlled by the PH adjusting section 302 will also be called the preheat time adjustment processing (PH time adjustment processing). Further, the control concerning the amount of a voltage to be applied to the heater element HE will be called the application control. The PH adjusting section 302 transmits/receives data concerning the PH time adjustment processing to/from the HDC 63 as in the case of the levitation control section 301. For example, the PH adjusting section 302 receives data necessary for the levitation control processing on a track which is the object of the processing from the HDC 63 before the PH time adjustment processing is started. Further, in the PH time adjustment processing, the PH adjusting section 302 receives data concerning the quality of data read from the disk 1 from the HDC 63. Further, for example, the PH adjusting section 302 shares the data for specifying the objective track of the PH time adjustment processing with the write control section 303 or the read control section 304.

The write control section 303 controls the write processing of data to the magnetic disk 1. The write control section 303 controls the write processing in response to an execution request input thereto from the HDC 63. The write control section 303 controls the write processing in parallel with the levitation control processing to be carried out by the levitation control section 301 and PH time adjustment processing to be carried out by the PH adjusting section 302. The write control section 303 controls the write processing based on the shingled magnetic recording or normal write processing not based on the shingled magnetic recording. The write processing based on the shingled magnetic recording implies a method by which new data is recorded in such a manner as to overlap a part of the recorded data (in such a manner that a part of the recorded data is overwritten with the new data). The normal write processing implies a method by which new data is recorded in such a manner that the new data does not overlap the recorded data (in such a manner that no part of the recorded data is overwritten with the new data). It should be noted that the servo processing can be executed as processing of a part of the write processing.

The read control section 304 controls the read processing of data from the magnetic disk 1. The read control section 304 controls the read processing in response to an execution request input thereto from the HDC 63. The read control section 304 controls the read processing in parallel with the levitation control processing to be carried out by the levitation control section 301 and PH time adjustment processing to be carried out by the PH adjusting section 302. The read control section 304 receives evaluation data which is information for evaluating data read concomitantly with the read processing from the HDC 63. The read control section 304 outputs the received evaluation data to the PH adjusting section 302 in response to a request from the PH adjusting section 302. It should be noted that the servo processing can be executed as processing of a part of the read processing.

As described above, the plurality of processing items according to this embodiment are controlled by the plurality of functional sections realized by the CPU 62.

Next, details of the PH time adjustment processing to be executed by the PH adjusting section will be described below.

Figure 3:
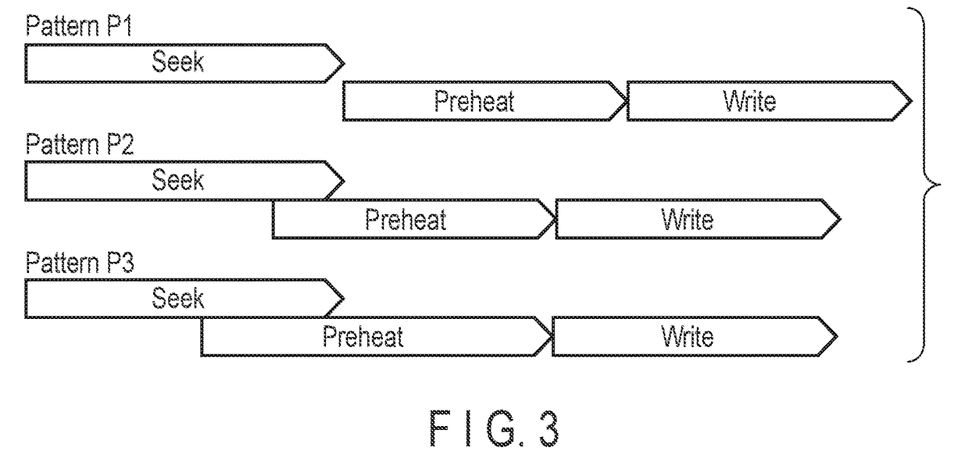
FIG. 3 is a view for explaining the PH time adjustment processing to be executed during a seek operation at the time of write processing according to the first embodiment.

FIG. 3 is a view for explaining the PH time adjustment processing to be executed during a seek operation at the time of write processing.

As shown in FIG. 3, three patterns of the PH time adjustment processing are shown. The pattern P1 shows the PH time adjustment processing in which preheat is started after the seek operation is completed, and write processing is started after the preheat is completed. The pattern P2 shows the PH time adjustment processing in which preheat is started at such timing that the velocity of the seek operation becomes low, and the write processing is started after the preheat is completed. The pattern 3 shows the PH time adjustment processing in which preheat is started at such timing that the velocity of the seek operation is still high, and the write processing is started after the preheat is completed.

As described above, although there are three patterns of PH time adjustment processing, according to the pattern P1, the time required to make the write condition better becomes longer at the time of a start of write. According to the pattern P2, preheat is started approximately when the seek velocity becomes lower, and the time required to make the write condition better is shorter than the pattern P1. Furthermore, according to the pattern P3, although the preheat processing is started when the seek velocity is still high in consideration of the fact that the preheat time is made longer in recent years, in this case, as already described previously, a possibility of the heater element HE coming into contact with the surface of the magnetic disk 1 arises. Accordingly, it becomes necessary to avoid the contact of the heater element HE with the surface of the magnetic disk 1 while adopting the pattern P3. In this embodiment, in order to avoid the contact, control of voltage application (to be described later with reference to FIGS. 9 to 14) to the heater element HE is executed by the CPU 62.

Here, the reason for executing the control of application of a voltage to the heater element HE will be described in detail with reference to FIGS. 4 to 8.

Figure 4:
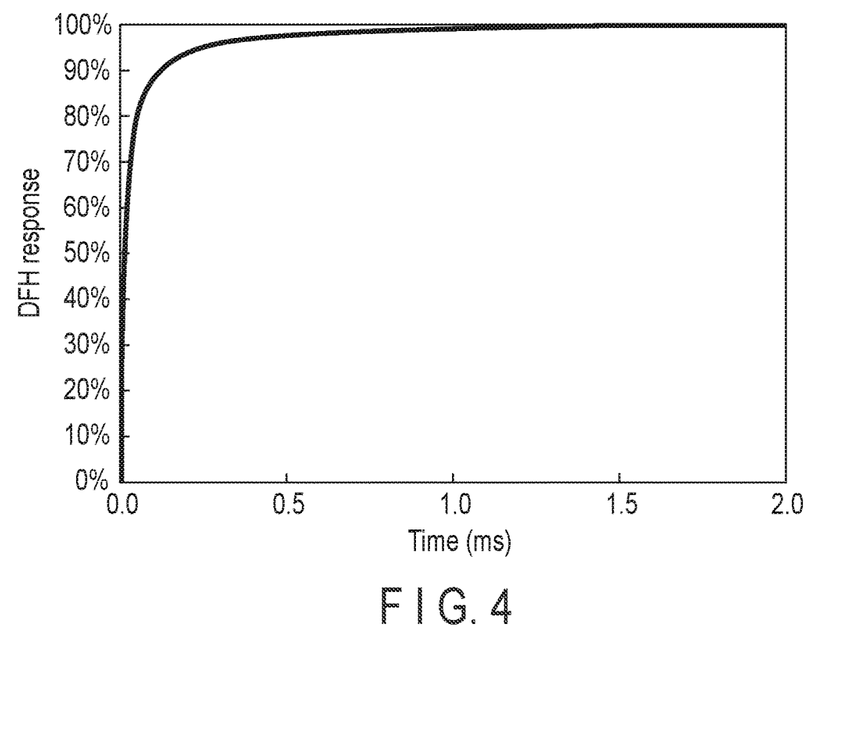
FIG. 4 is a view showing an example of the pushing-out responsiveness of the DFH control according to the first embodiment.

FIG. 4 is a view showing an example of the pushing-out responsiveness of the DFH control. In FIG. 4, the axis of abscissa indicates voltage application time (ms), and axis of ordinate indicates the responsiveness (%) of the DFH control. The responsiveness of the DFH control has the characteristics that when a voltage is applied to the heater element HE, pushing-out is abruptly carried out up to about 80% of the total amount of the pushing-out within a short time and, thereafter approximately 100% of the pushing-out amount is reached in about 1.0 ms. As described above, the pushing-out to be carried out by the heater element HE has a time constant, and hence if write processing is started before the pushing-out is sufficiently carried out or heat becomes stable, it can be seen that the write processing is executed in a state where the levitation amount (gap of the element section) of the slider 2 relative to the magnetic disk 1 is large, and the bit error rate (BER) is deteriorated.

Figure 5:
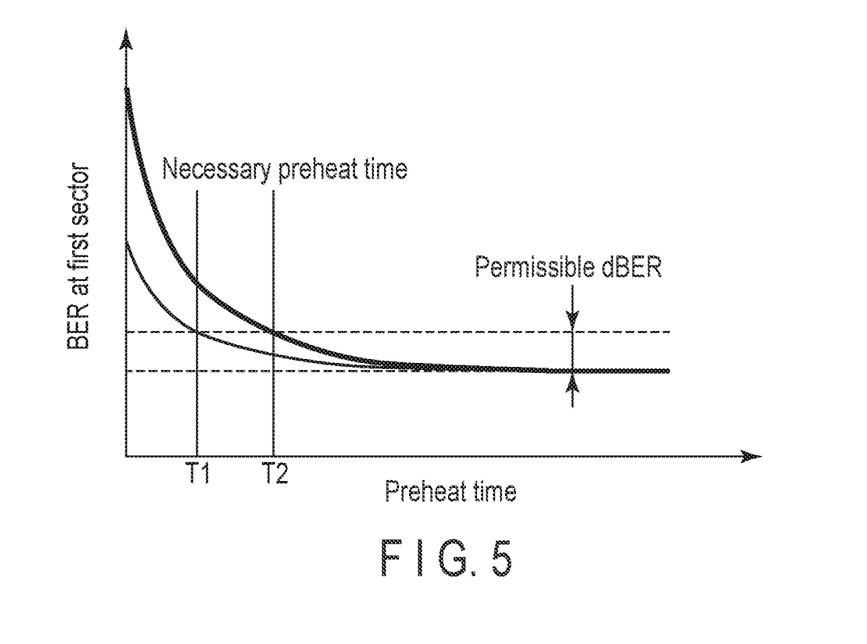
FIG. 5 is a view showing an example of a relationship between the preheat time and bit error rate (BER) of the first sector according to the first embodiment.

FIG. 5 is a view showing an example of a relationship between the preheat time and bit error rate (BER) of the first sector. Here, the term 'first sector' implies a sector to which data is written for the first time after the write processing is started. In FIG. 5, the axis of abscissa indicates the preheat time, and axis of ordinate indicates the BER of the first sector. Each of the time T1 and time T2 indicates the necessary preheat time. As indicated by the thick line in FIG. 5, when the BER deterioration of which is permitted is defined as the permissible dBER, it can be seen that unless the preheat time is at least longer than or equal to the time T1, a risk of a write error occurring arises. In recent years, in a magnetic disk device 10, the sensitivity to the BER such as the influence exerted by the change in the levitation or the like becomes higher, and the current state is as indicated by the thin line in FIG. 5. For this reason, the necessary preheat time has become longer from the time T1 to the time T2. That is, when the preheat time is prolonged by the processing of the already-described pattern P1, the total of the seek time and preheat time elapses before the write processing is started, and thus the time up to the time to start the write processing becomes cumulatively longer, whereby the write performance is deteriorated. In order to avoid such a situation, as in the case of the already-described pattern P2 of FIG. 3, when the preheat processing is carried out from the middle of the seek operation, it becomes possible to shorten the time elapsing before the start of the write processing by a length corresponding to an overlap between the seek operation and preheat time. However, as in the case of the pattern P3, when the overlap between the seek operation and preheat time is made longer by taking the fact that in recent years, the preheat time has become longer into consideration, while the time elapsing before the start of the write processing becomes shorter, the preheat is started when the seek velocity is still high. As a result, variations in the levitation of the slider 2 occur due to the influence of the airflow caused by the seek operation.

Figure 6A:
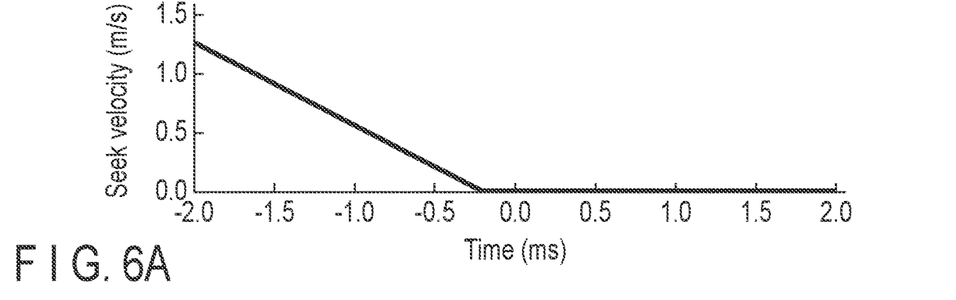
FIG. 6A is a view showing an example of a relationship between the seek velocity and levitation amount of the slider during the seek operation according to the first embodiment.
Figure 6B:
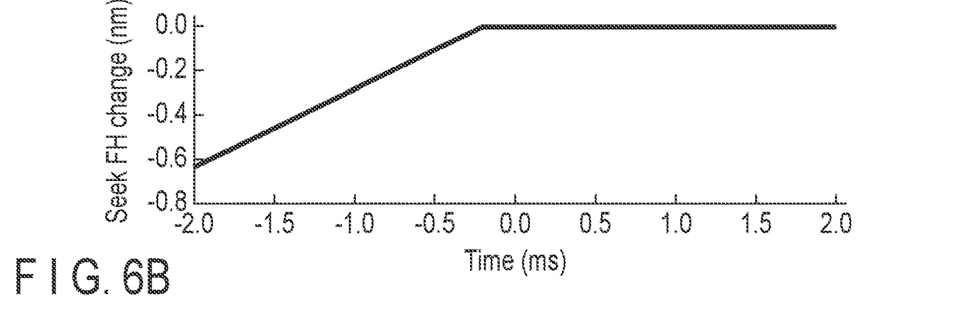
FIG. 6B is a view showing an example of a relationship between the seek velocity and levitation amount of the slider during the seek operation according to the first embodiment.

FIG. 6A and FIG. 6B is a view showing an example of a relationship between the seek velocity and levitation amount of the slider 2 during the seek operation. In FIG. 6A and FIG. 7B, the axis of abscissa indicates time (ms). The axis of ordinate of FIG. 6A indicates the seek velocity, and axis of ordinate of FIG. 6B indicates the variation (nm) in the levitation amount of the slider 2. It should be noted that the time base is the time of positioning completion after the seek operation. As shown in FIG. 6A, the more precedent the time to the positioning completion time, the higher the seek velocity before completion of the seek operation is. The variation in the levitation amount is approximately proportionate to the seek velocity, and hence the variation in the levitation amount of the slider 2 is as shown in FIG. 6B. Due to the overlap between the levitation variation and already-described pushing-out responsiveness of the heater element HE, a risk of the position of the element section becoming lower than the predetermined gap arises.

Figure 7A:
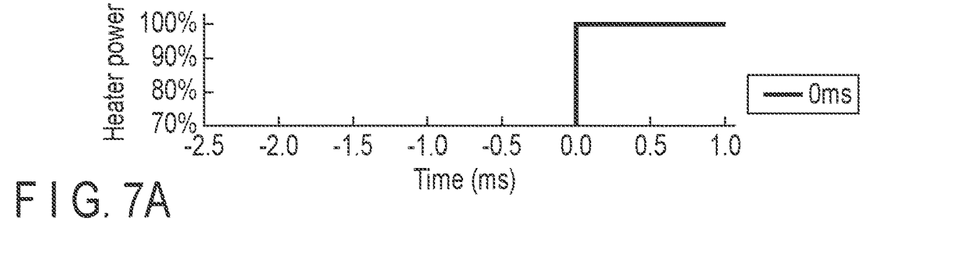
FIG. 7A is a view for explaining the setting method of the heater power according to the first embodiment.
Figure 7B:
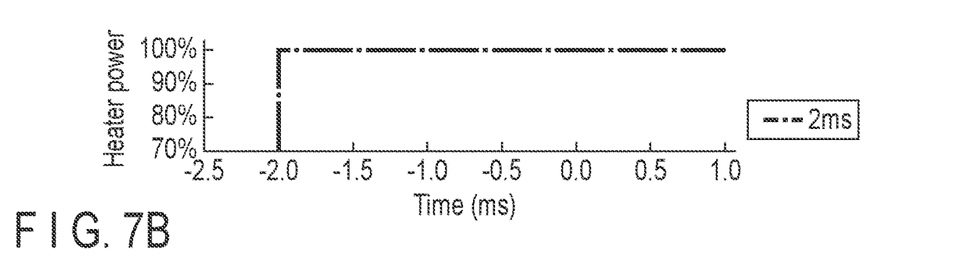
FIG. 7B is a view for explaining the setting method of the heater power according to the first embodiment.

FIG. 7A and FIG. 7B is view for explaining the setting method of the heater power. In FIG. 7A and FIG. 7B, the axis of abscissa indicates time (ms) and axis of ordinate indicates heater power (%).

FIG. 7A corresponds to the already-described pattern P1, and FIG. 7B corresponds to the already-described pattern P3. The time length of overlap between the seek operation and preheat time of each of FIG. 7A and FIG. 7B is 0 ms, and −2.0 ms. In either case, the voltage applied to the heater element HE becomes 100% or 0%, and voltage of 100% is applied to each heater element HE at each of the time 0 ms and time −2.0 ms. With this control of voltage application to the heater element HE, there is a possibility of the time elapsing before the write processing becoming longer (FIG. 7A) or a possibility of the element section of the slider 2 coming into contact with the magnetic disk 1 (FIG. 7B). In order to avoid such situations, in this embodiment, the control of voltage application to the heater element HE to be described later with reference to FIGS. 9 to 14 is executed while the pattern P3 is adopted.

Figure 8:
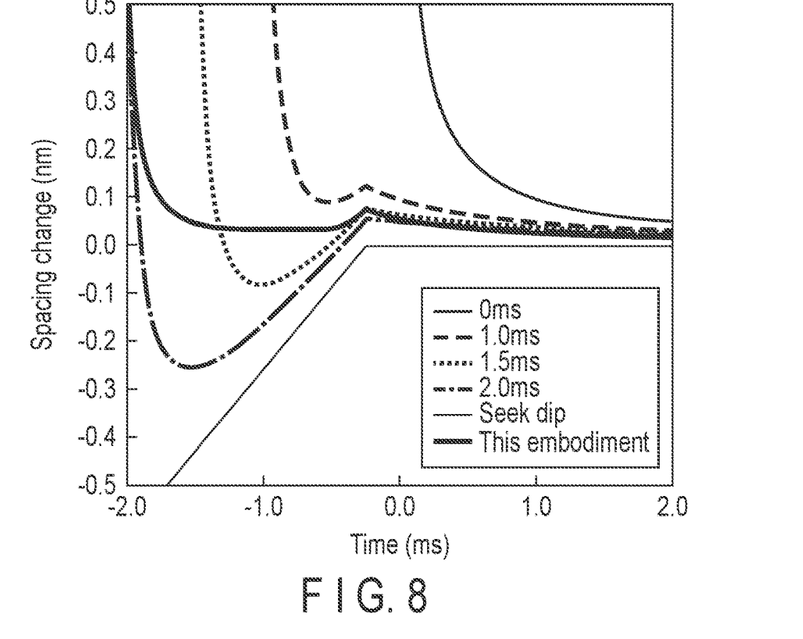
FIG. 8 is a view showing an example of comparisons between levitation variation amounts of the position of the element section according to the first embodiment.

FIG. 8 is a view showing an example of comparisons between levitation variation amounts of the position of the element section of the slider 2. In other words, FIG. 8 shows the changes in the difference (space) between the position (height) of the element section and the predetermined gap. A change in the space (levitation amount) in each of the cases where the time of overlap between the seek operation and preheat time is made 0 ms (pattern P1), 1 ms, 1.5 ms, and 2.0 ms is shown. From FIG. 8, it is seen that when the overlap time is 1.5 ms and 2.0 ms, the levitation amount of the element section is less than the predetermined value. In such cases, it is indicated that a risk of the element section coming into contact with the magnetic disk 1 will arise. From these facts, it is seen that there is a limit to making the seek time and preheat time overlap each other and, when the time of the overlap between the seek time and preheat time is prolonged, the element section comes into contact with the magnetic disk 1, and write performance of the magnetic disk device 10 becomes deteriorated. It should be noted that when the control of voltage application to the heater element HE to be described with reference to FIGS. 9 to 14 is executed, it is indicated by the thick line (this embodiment) in FIG. 8 that even if the time of overlap between the seek operation and preheat time is prolonged, the levitation amount of the element section never becomes less than the predetermined value, and the contact of the element section with the magnetic disk 1 can be avoided.

Hereinafter, the control of voltage application to the heater element HE of this embodiment will be described with reference to FIGS. 9 to 14. FIGS. 9 to 14 respectively correspond to the first to sixth application control operations of starting application of a first voltage to the heater element HE during a seek operation in which the slider 2 from the current position (first position) to a target position (second position) and, after the application of the first voltage, applying a second voltage greater than the first voltage to the heater element HE before the slider 2 is positioned to the target position and data is written by the slider 2. It should be noted that in each of FIGS. 9 to 14, the axis of abscissa indicates time (ms), the time 0 (0 ms) is the already-described positioning completion time after the seek operation, more specifically, the time 0 is the seek operation termination time, and is also the write start time. The axis of ordinate indicates the amount of the voltage (hereinafter also referred to as heater power) to be applied to the heater element HE, and defines the state where the heater power is at the maximum as the state of 100%. Although in this embodiment, the first to sixth application control operations are executed by the CPU 62 by reading firmware and instructing the head amplifier IC 22 to execute the application control operations, the control operations may also be executed by the head amplifier IC 22 on the basis of the preheat time designated by the PH adjusting section 302 and on the basis of a voltage value set in advance.

Figure 9:
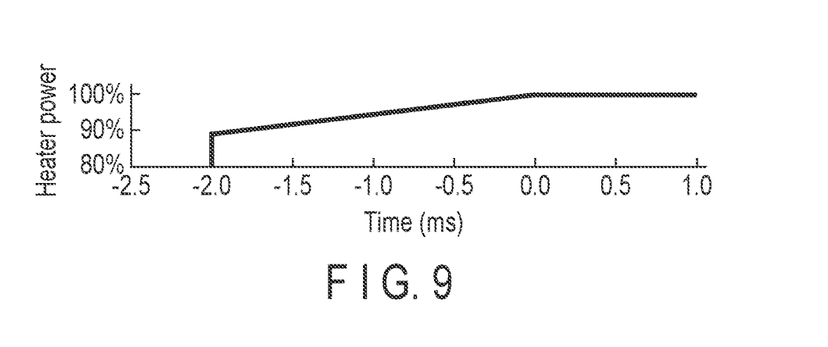
FIG. 9 is a view showing an example of first application control according to the first embodiment.

FIG. 9 is a view showing an example of the first application control. The first application control is application control of starting voltage application to the heater element HE while the seek operation is carried out, and gradually increasing the heater power to the maximum voltage value.

More specifically, in this embodiment, as shown in FIG. 9, at the time 2.0 ms precedent to the time 0 (hereinafter precedent to the time 0 is also simply written as "−"), a voltage is applied to the heater element HE in such a manner as to make the heater power has the amount of 90%. Then, from this state, the heater power is gradually and linearly increased in such a manner as to reach the maximum amount (100%) of the heater power at the time 0 ms. As described above, the first application control is application control of applying a voltage to the heater element HE to be carried out by the CPU 62.

Figure 10:
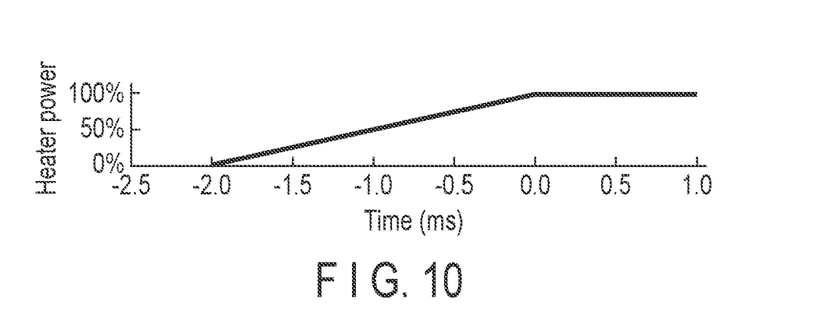
FIG. 10 is a view showing an example of second application control according to the first embodiment.

FIG. 10 is a view showing an example of the second application control. The second application control is application control of starting the application to the heater element HE while the seek operation is carried out, and gradually increasing the heater power to the maximum voltage value, and the initial value of the heater power is set to 0.

More specifically, in this embodiment, as shown in FIG. 10, the initial value at the time −2.0 ms is the heater power of 0%, and the heater power is gradually increased linearly in such a manner as to make the heater power reach 100% at the time 0 ms. As described above, the second application control is application control of applying a voltage to the heater element HE to be carried out by the CPU 62.

Figure 11:
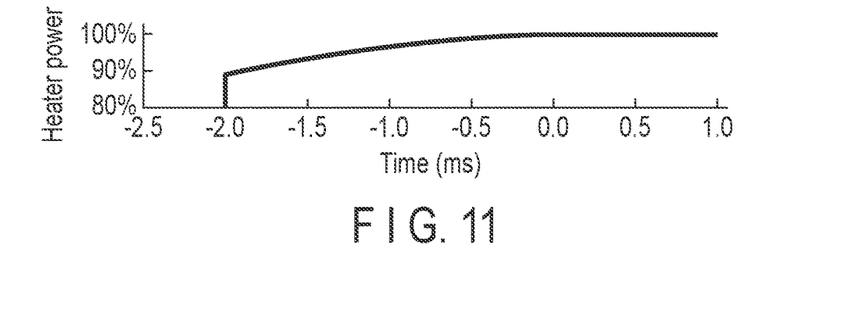
FIG. 11 is a view showing an example of third application control according to the first embodiment.

FIG. 11 is a view showing an example of the third application control. The third application control is application control of starting the application to the heater element HE while the seek operation is carried out, and curvilinearly increasing the heater power to the maximum voltage value by taking the responsiveness of pushing-out to be carried out by the heater into consideration.

More specifically, in this embodiment, as shown in FIG. 11, at the time −2.0 ms, the heater power is about 90%, and from this state, the heater power is curvilinearly and gradually increased in such a manner as to make the heater power reach 100% at the time 0 ms by taking the pushing-out responsiveness described already with reference to FIG. 4 into consideration. As described above, the third application control is application control of applying a voltage to the heater element HE to be carried out by the CPU 62.

Figure 12:
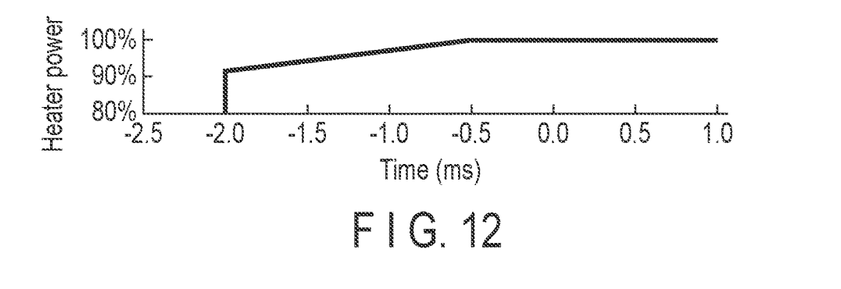
FIG. 12 is a view showing an example of fourth application control according to the first embodiment.

FIG. 12 is a view showing an example of the fourth application control. The fourth application control is application control of starting the application to the heater element HE while the seek operation is carried out, and increasing the heater power to the maximum voltage value before the seek operation is completed.

More specifically, in this embodiment, as shown in FIG. 12, the heater power is about 90% at the time −2.0 ms, and is gradually increased linearly in such a manner as to make the heater power reach 100% at the time −0.5 ms. As described above, the fourth application control is application control of applying a voltage to the heater element HE to be carried out by the CPU 62. Here, the seek velocity becomes considerably low before the seek operation is completed, and it becomes possible to neglect the velocity. Accordingly, increasing of the heater power is synchronized with the seek velocity, and control is carried out in such a manner that the heater power reaches 100% before the seek operation is completed.

Figure 13:
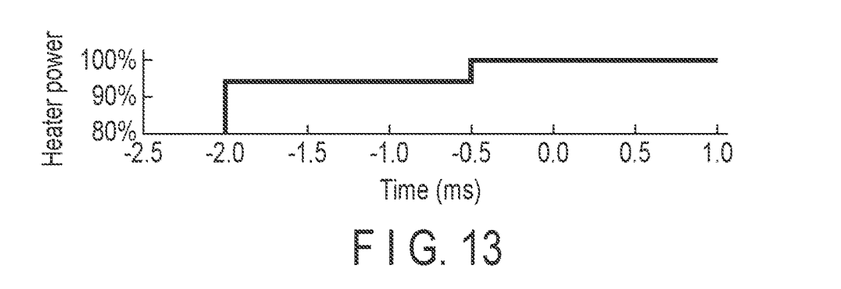
FIG. 13 is a view showing an example of fifth application control according to the first embodiment.

FIG. 13 is a view showing an example of the fifth application control. The fifth application control is application control of starting the application to the heater element HE while the seek operation is carried out, and increasing the heater power in such a manner that the voltage can reach the maximum voltage value in a stepped manner with the heater power being restricted to less than or equal to the heater power leading to the maximum pushed-out amount.

More specifically, in this embodiment, as shown in FIG. 13, the heater power is about 90% at the time −2.0 ms, and heater power reaches 100% at the time −0.5 ms. As described above, the fifth application control is application control of applying a voltage to the heater element HE to be carried out by the CPU 62. As described above, the heater power is controlled in a stepped manner while the heater power is restricted to less than or equal to the heater power leading to the maximum pushed-amount, and hence, as compared with the control of gradually increasing the heater power, it is possible to make the circuit configuration of the head amplifier IC 22 simpler.

Figure 14:
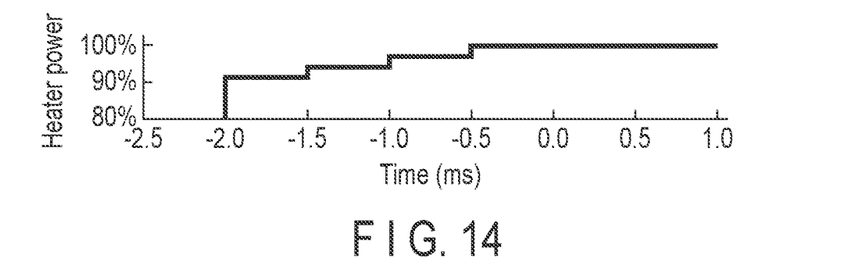
FIG. 14 is a view showing an example of sixth application control according to the first embodiment.

FIG. 14 is a view showing an example of the sixth application control. The sixth application control is application control of starting the application to the heater element HE while the seek operation is carried out, and increasing the voltage to the maximum voltage value in a stepwise manner by applying heater power less than or equal to the heater power leading the maximum pushed-out amount. Here, the term 'in a stepwise manner' implies that the heater power has a plurality of steps.

More specifically, in this embodiment, as shown in FIG. 14, the sixth application control is such control that at the time −2.0 ms, the heater power is about 90%, at the time −1.5 ms, the heater power is about 93%, at the time −1.0 ms, the heater power is about 96%, and at the time −0.5 ms, the heater power reaches 100%. As described above, the sixth application control is application control of applying a voltage to the heater element HE to be carried out by the CPU 62. As described above, the heater power is controlled in a stepwise manner while the heater power is restricted to less than or equal to the heater power leading to the maximum pushed-amount, and hence, as compared with the control of gradually increasing the heater power, it is possible to make the circuit configuration of the head amplifier IC 22 simpler and, furthermore, as compared with the case of the already-described fifth application control where the heater power is increased in a stepped manner, it is possible to carry out voltage application control with a higher degree of accuracy.

As described above, by executing the already-described first to sixth application control operations, the magnetic disk device 10 can control the heater power before the time 0, i.e., before the timing at which the seek operation is terminated and write operation is completed, and hence even when the preheat processing is started while the seek velocity of the seek operation being carried out is still high, it is possible to suppress the variation in the levitation amount of the slider 2, and improve the write condition at the time of the start of write.

Second Embodiment

A second embodiment differs from the already-described first embodiment in that the slider 2 is provided with a thermal assist section configured to assist write of data. Accordingly, the configuration and control resulting from providing the thermal assist section will be described below in detail. It should be noted that configurations identical to the above-described first embodiment are denoted by reference symbols identical to the first embodiment and descriptions of these configurations are omitted.

Figure 15:
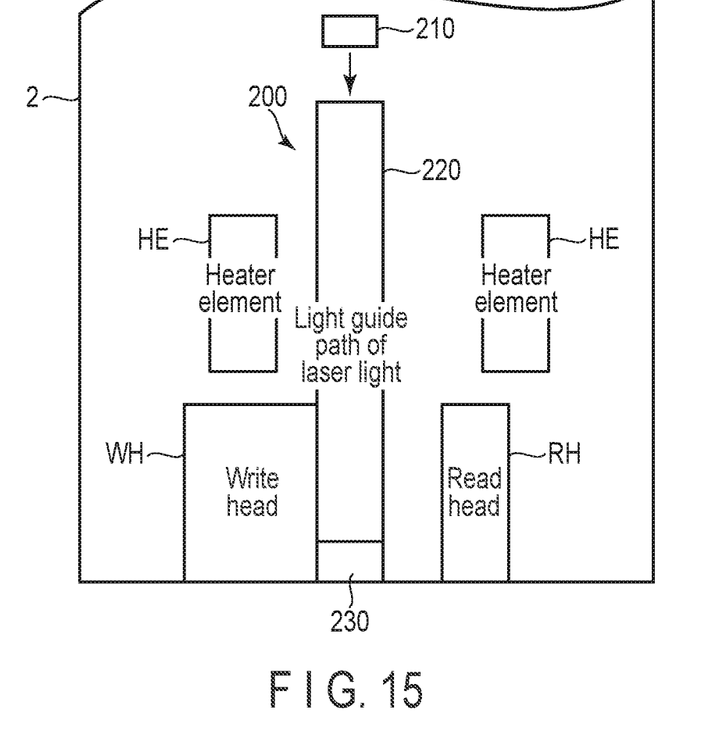
FIG. 15 is a schematic cross-sectional view showing an example of the configuration of a thermal assist section according to a second embodiment.

FIG. 15 is a schematic cross-sectional view showing an example of the configuration of a thermal assist section included in the slider 2.

As shown in FIG. 15, the slider 2 includes two heater elements HE, read head RH, write head WH, and thermal assist section 200. The thermal assist section 200 includes a light source 210 configured to emit laser light, light guide path 220 of the laser light, and optical element (near-field optical element) 230. In the magnetic disk device 10 configured as described above, when data is written to the magnetic disk 1 by the write head WH, the laser light from the light source 210 passes through the light guide path 220, and is applied to the magnetic disk 1 through the optical element 230, and write of data is assisted by the laser light. Accordingly, when the levitation amount control of the element section of the slider 2 is carried out, it becomes necessary to take heating by means of the laser light into consideration in addition to the heater power of the heater elements HE. In this case too, by taking heating by the laser light (hereinafter also referred to as laser power) into consideration, even when the preheat processing is started while the seek velocity is still high, it is possible to suppress variations in the levitation amount of the slider 2, and improve the write condition at the time of a start of write.

Figure 16:
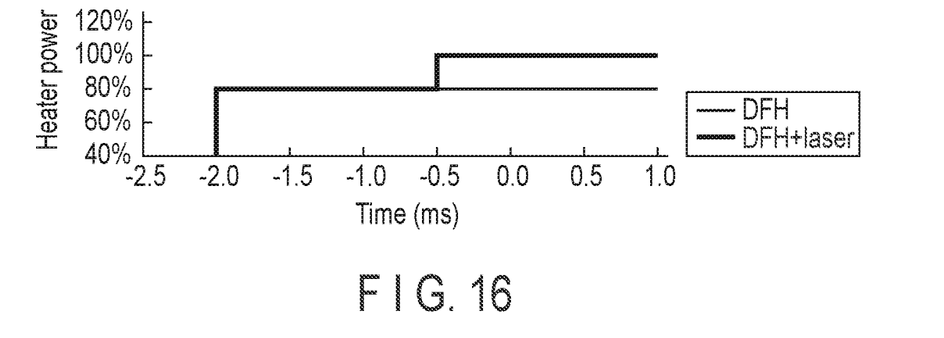
FIG. 16 is a view showing an example of seventh application control according to the second embodiment.
Figure 17:
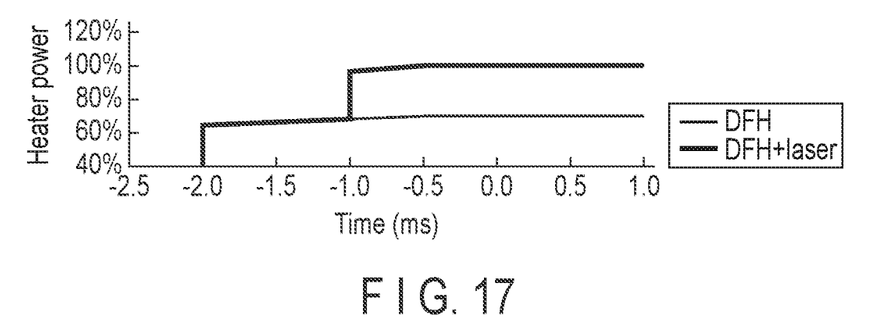
FIG. 17 is a view showing an example of eighth application control according to the second embodiment.

Here, when the time constants of the thermal deformation resulting from the heater power and thermal deformation resulting from the laser power are considered, the responsiveness of the thermal deformation resulting from the laser power is faster. Accordingly, it is not always necessary to coincide the timing of applying a voltage to the heater elements HE and timing of applying a voltage to the light source 210 with each other. That is, when the responsiveness is considered, after applying a voltage to the heater elements HE, when a predetermined time has elapsed, a voltage may be applied to the light source 210. Although details will be described later, each of the following seventh application control and eighth application control is control taking the responsiveness into consideration.

Hereinafter, the voltage application control of this embodiment will be described with reference to FIGS. 16 to 19. FIGS. 16 to 19 respectively correspond to the seventh to tenth application control operations of starting application of a first voltage to the heater elements HE while the seek operation in which the slider 2 moves from the current position (first position) to the target position (second position) is carried out, and before the slider 2 is positioned to the target position after the first voltage is applied to the heater elements HE, and writes data, applying a second voltage greater than the first voltage to the heater elements HE and, when the voltage is increased to the second voltage, carrying out control of the amount of the voltage on the basis of the total value of the amount of the voltage to be applied to the heater elements HE, and intensity of the laser light. It should be noted that in FIGS. 16 to 19, the axis of abscissa indicates time (ms), the time 0 is the seek operation termination time, and is the start time of write. Further, the axis of ordinate indicates heater power. Furthermore, the thin line shown in each of FIGS. 16 to 19 indicates the heater power (DFH) of the heater elements HE, and thick line shown in each of FIGS. 16 to 19 indicates the heater power of the total value of the DFH and laser power, and the total value (100%) is the heater power necessary for improvement of the write condition.

FIG. 16 is a view showing an example of the seventh application control. The seventh application control is application control of first starting voltage application to the heater elements HE while the seek operation is carried out and, thereafter applying a voltage to the light source 210 of the laser light before the time 0, and increasing the voltage applied to the light source 210 to the maximum voltage.

More specifically, in this embodiment, as shown in FIG. 16, the voltage is applied to the heater elements HE in such a manner that the voltage becomes about 80% at the time −2.0 ms, and the voltage applied to the heater elements HE is kept in this state. Then, at the time −0.5 ms, a voltage is applied to the laser light source 210, the laser power is added to the heater power of the heater elements HE and the total value is made 100%. As described above, the seventh application control is application control of applying voltages to the heater elements HE and light source 210 to be carried out by the CPU 62. Of the seventh to tenth application control operations, the seventh application control is the simplest control.

FIG. 17 is a view showing an example of the eighth application control. The eighth application control is application control of first starting voltage application to the heater elements HE while the seek operation is carried out and, thereafter applying a voltage to the light source 210 of the laser light before the time 0, this being identical to the case of already-described FIG. 16. The eighth application control differs from the seventh application control in that the voltage to be applied to the heater elements HE is gradually increased to the maximum voltage value.

More specifically, in this embodiment, as shown in FIG. 17, a voltage is applied to the heater elements HE in such a manner that the heater power of the heater elements HE exceeds 60% by a small amount at the time −2.0 ms, and the heater power is gradually increased in such a manner that the heater power becomes about 70% at the time −0.5 ms. Further, at the time −1.0 ms, a voltage is applied to the light source 210, the laser power is added to the heater power, and the total value is made to reach 100% at the time −0.5 ms. As described above, the eighth application control is application control of applying voltages to the heater elements HE and light source 210 to be carried out by the CPU 62.

Figure 18:
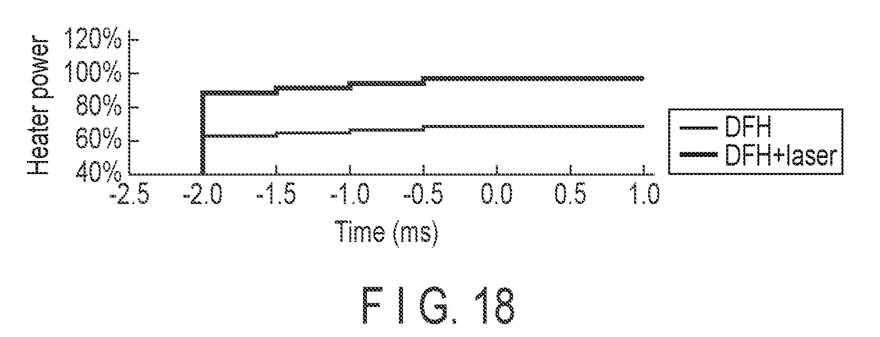
FIG. 18 is a view showing an example of ninth application control according to the second embodiment.

FIG. 18 is a view showing an example of the ninth application control. The ninth application control is application control of simultaneously carrying out voltage application to the heater elements HE and voltage application to the light source 210, increasing the voltage to be applied to the heater elements HE to the maximum voltage value in a stepwise manner, and making the total value of the heater power and laser power reach 100% before the time 0.

More specifically, in this embodiment, as shown in FIG. 18, the voltages are simultaneously applied to the heater elements HE and light source 210 in such a manner that the power becomes about 90% at the time −2.0 ms, the voltage to be applied to the heater elements HE is increased in a stepwise manner at the time −1.5 ms, −1.0 ms, and −0.5 ms, then, concomitantly with this, the total value is gradually increased, and is made to reach 100% at the time −0.5 ms. As described above, the ninth application control is application control of applying voltages to the heater elements HE and light source 210 to be carried out by the CPU 62.

Figure 19:
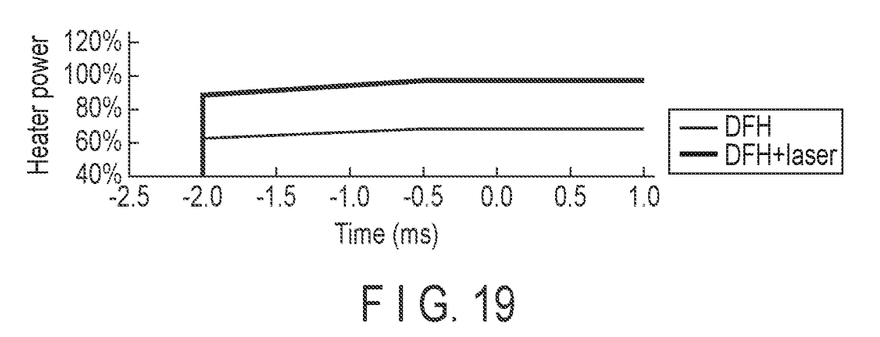
FIG. 19 is a view showing an example of tenth application control according to the second embodiment.

FIG. 19 is a view showing an example of the tenth application control. The tenth application control is application control of simultaneously carrying out voltage application to the heater elements HE and voltage application to the light source 210, gradually increasing the voltage to be applied to the heater elements HE, and increasing the total value to the maximum voltage value before the time 0.

More specifically, in this embodiment, as shown in FIG. 19, voltages are applied to the heater elements HE and light source 210 in such a manner that the power becomes about 90% at the time −2.0 ms, and the voltage to be applied to the heater elements HE is gradually increased to the maximum voltage value in such a manner that the total value reaches 100% at the time −0.5 ms. As described above, the tenth application control is application control of applying voltages to the heater elements HE and light source 210 to be carried out by the CPU 62.

As described above, in the magnetic disk device 10 including the thermal assist section 200 too, by executing the already-described seventh to tenth application control operations, as in the case of the first embodiment, the magnetic disk device can suppress the heater power before the time 0, and hence even when the preheat processing is started while the seek velocity of the seek operation being carried out is still high, it is possible to suppress the variations in the levitation amount of the slider 2, and improve the write condition at the time of a start of write.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head configured to read/write data from/to the magnetic disk;
a heater by which a distance between the magnetic disk and the magnetic head is adjusted on the basis of a voltage applied to the heater; and
a control section configured to control the magnetic head to carry out a seek operation from a first position to a second position before writing data to the magnetic disk, wherein
during the seek operation, the control section gradually increases the voltage applied to the heater from a first voltage value to a second voltage value that is greater than the first voltage value.

2. The magnetic disk device of claim 1, wherein the second voltage value is the maximum voltage value of the voltage to be applied to the heater.

3. The magnetic disk device of claim 1, wherein the first voltage value is 0 V.

4. The magnetic disk device of claim 2, wherein the control section curvilinearly increases the voltage applied to the heater from the first voltage value to the maximum voltage value.

5. The magnetic disk device of claim 2, wherein the control section increases the voltage applied to the heater from the first voltage value to the maximum voltage value in a stepped manner.

6. The magnetic disk device of claim 1, wherein after the application of the voltage having the first voltage value, the control section changes the voltage applied to the heater according to a target seek velocity of the magnetic head.

7. The magnetic disk device of claim 2, further comprising:
a thermal assist section including a light source configured to radiate a laser light on the basis of a voltage applied thereto to generate heat and assist the magnetic head in writing data to the magnetic disk, wherein
the control section increases the voltage applied to the heater further based on an intensity of the laser light.

8. The magnetic disk device of claim 7, wherein after the application of the voltage having the first voltage value to the heater, the control section starts application of a voltage to the light source.

9. A voltage application method of a magnetic disk device including
- a magnetic disk;
- a magnetic head configured to read/write data from/to the magnetic disk;
- a heater by which a distance between the magnetic disk and the magnetic head is adjusted on the basis of a voltage applied to the header; and
- a control section configured to control the magnetic head to carry out a seek operation from a first position to a second position before writing data to the magnetic disk, the method comprising:
- during the seek operation, gradually increasing the voltage applied to the heater from a first voltage value to a second voltage value that is greater than the first voltage value.

* * * * *